(12) United States Patent
Moussaoui et al.

(10) Patent No.: US 7,138,789 B2
(45) Date of Patent: Nov. 21, 2006

(54) MULTIPHASE CONVERTER WITH ZERO VOLTAGE SWITCHING

(75) Inventors: Zaki Moussaoui, Palm Bay, FL (US); Thomas Victorin, Palm Bay, FL (US)

(73) Assignee: Intersil Corporation, Milpitas, CA (US)

(\*) Notice: Subject to any disclaimer, the term of this patent is extended or adjusted under 35 U.S.C. 154(b) by 44 days.

(21) Appl. No.: 10/852,603

(22) Filed: May 24, 2004

(65) Prior Publication Data

US 2005/0156579 A1    Jul. 21, 2005

Related U.S. Application Data

(60) Provisional application No. 60/538,091, filed on Jan. 21, 2004.

(51) Int. Cl.
*G05F 1/40* (2006.01)
(52) U.S. Cl. .................... 323/272; 323/235
(58) Field of Classification Search ........ 323/272, 323/235, 224
See application file for complete search history.

(56) References Cited

U.S. PATENT DOCUMENTS

| 4,931,716 | A | * | 6/1990 | Jovanovic et al. | 323/285 |
| 5,793,191 | A | * | 8/1998 | Elmore et al. | 323/272 |
| 6,429,628 | B1 | * | 8/2002 | Nakagawa | 323/224 |
| RE38,454 | E | | 3/2004 | Walters et al. | 323/272 |
| 6,897,641 | B1 | * | 5/2005 | Herbert | 323/282 |
| 6,960,905 | B1 | * | 11/2005 | Chen et al. | 323/283 |
| 2003/0038614 | A1 | | 2/2003 | Walters et al. | 323/282 |
| 2003/0201761 | A1 | | 10/2003 | Harris | 323/272 |
| 2004/0070382 | A1 | | 4/2004 | Walters et al. | 323/284 |

\* cited by examiner

*Primary Examiner*—Shawn Riley
(74) *Attorney, Agent, or Firm*—Meschkow & Gresham, P.L.C.

(57) ABSTRACT

A multiphase DC-to-DC converter includes at least two phase circuits each having upper and lower power switches and a front-end inductor that is operative for forming a resonant tank circuit with the phase circuits to ensure zero voltage switching and minimizing power losses.

27 Claims, 18 Drawing Sheets

$$i_r(t) = I_{o1} + \sin\left(\frac{t}{\sqrt{C_{r2up}L_r}}\right) V_{in} \sqrt{\frac{C_{r2up}}{L_r}}$$

$$V_{cr2up}(t) = V_{in} - \cos\left(\frac{t}{\sqrt{C_{r2up}L_r}}\right) V_{in}$$

FIG. 12B

WITH FOLLOWING INITIAL CONDITION $Vcr(0)=Vm$ and $i_r(0)=I_{r2}$ $$Vcr(t)=Vin+(-Vin+Vm)\cos\left(\frac{t}{\sqrt{(C_{r1up}+C_{r2up})L_r}}\right)+I_{r2}\sin\left(\frac{t}{\sqrt{(C_{r1up}+C_{r2up})L_r}}\right)\sqrt{\frac{L_r}{C_{r1up}+C_{r2up}}}$$

$$i_r(t)=\frac{(Vin+Vm)\sin\left(\frac{t}{\sqrt{(C_{r1up}+C_{r2up})L_r}}\right)}{\sqrt{\frac{L_r}{C_{r1up}+C_{r2up}}}}+I_{r2}\cos\left(\frac{t}{\sqrt{(C_{r1up}+C_{r2up})L_r}}\right)$$

MULTIPHASE CONVERTER WITH ZERO VOLTAGE SWITCHING

RELATED INVENTION

The present invention claims benefit under 35 U.S.C. §119(e) to U.S. Provisional Patent Application Ser. No. 60/538,091, filed 21 Jan. 2004, which is incorporated by reference herein.

FIELD OF THE INVENTION

The present invention relates to the field of electronic circuits, and more particularly, to DC-to-DC converters and switch mode power supplies for example, Buck converters.

BACKGROUND OF THE INVENTION

DC-to-DC converters typically are designed as switching regulated power supplies, also known as switch-mode power supplies. Some DC-to-DC converters raise voltage from a lower input voltage (step-up converters), and others lower voltage from a higher input voltage (step-down converters). One type of step-down switch mode power supply is known as a Buck converter. These devices resemble linear power supplies in some respects, but in other ways are much different. A switching power supply typically includes an energy-storage inductor, and sometimes a non-linear regulator network. This type of power supply may incorporate a regulation system in which a control element, for example, a power MOSFET switch, is switched on and off rapidly. Controlling on/off pulses may be produced by an oscillator/error amplifier/pulse-width modulator network as a controller. Thus, in a more common variety of switching regulator, the transistor switch, for example, the MOSFET, is a control element.

During an ON cycle, energy may be pumped into an inductor and stored in a magnetic field. When the control element is turned OFF, the energy stored in the inductor is directed into a filter and load. Various sampling circuits may sample the output voltage and feed a sample to an input of an error amplifier as part of a controller. The sample voltage may be compared with a reference voltage and an error amplifier may increase its output control voltage, which may be sent to a pulse-width modulator. The pulse-width modulator may produce a modified ON/OFF signal, for example, a square wave whose ON and OFF times are determined by the input error voltage.

More specific examples of DC-to-DC converters as switch mode power supplies are disclosed in commonly assigned, published U.S. patent application nos. 2003/0038614 and 2004/0070382, which are incorporated by reference herein. As noted before, a Buck converter is a specific type of step-down, DC-to-DC converter.

To power various microprocessors, and more particularly the next generation microprocessors, which may require a voltage of about one volt at up to 1,000 amps, the number of phases in a multiphase Buck converter has been increasing, sometimes requiring as many as eight phases. The optimum number of phases may be determined by the output current, system efficiency, transient requirements, thermal management, cost of capacitors, MOSFET performance, size restrictions, and overall system costs. A controller for Buck converters may be complicated and typically is designed as a multiphase pulse-width modulation (PWM) control integrated circuit with companion gate drivers, e.g., the HIP6301, HIP6601B, HIP6602B, HIP6603B, or HIP6604B with external MOSFETs, for example, as manufactured by the assignee of the present invention, Intersil Americas Inc.

Multiphase power conversion is an improvement over earlier single phase converter configurations and is used to satisfy the increasing current demands of modern microprocessors. Multiphase converters distribute the power and load current, which results in smaller and lower cost transistors with fewer input and output capacitors. This occurs because of higher effective conversion frequency with higher frequency ripple current and phase interleaving. Each phase circuit typically includes a lower MOSFET and an upper MOSFET as power switches. The requirement for decreasing the size of the converter along with the requirement for higher power densities requires an increase in the switching frequency used in the power converter. The use of a high switching frequency in these multiphase DC-to-DC converters, and especially Buck converters, however, may lead to switching losses, stresses on the power component, and EMI generation.

SUMMARY OF THE INVENTION

Accordingly, it is an advantage of the present invention that a multiphase converter with zero voltage switching is provided.

The present invention is advantageous and improves the efficiency of a switch mode power supply DC-to-DC converter because it is operable for zero voltage switching and may be used for non-isolated high input/low voltage output voltage converters, such as a Buck converter. The present invention uses a resonant tank circuit for a multiphase topology. The Vout/Vin DC transfer function depends on a number of phases, N. With the present invention, it is possible to achieve higher than normal output ripple cancellation than with existing Buck topologies.

In the present invention, the duty cycle is no longer a function of only the ON time but it is a function of the ON time and the number of phases N. The present invention detects the zero crossing, for example, using a PWM controller or other Buck controller. In the present invention, it is possible to create a zero voltage across the upper MOSFET before the power switches are turned ON or OFF. A resonant tank is created that achieves zero voltage across the power switches before they are turned ON or OFF as part of the improved topology. The front-end inductor creates a desired resonant tank circuit.

Typically a power switch has an inherent parasitic capacitance as part of a resonant tank. If the inherent parasitic capacitance is too small, it is possible to add a capacitor. A diode may also be added if the intrinsic diode capability of a power switch is insufficient.

In accordance with the present invention, the inductor at the front end does not allow the current to increase until a power switch is fully ON. There is no overlapping of current until the power switch turns ON. As to the inductor, its transition is smoother and the diode is slowly turning OFF instead of switching. Thus, it may be seen that when there is zero current across the upper power switches, there is zero voltage across the lower power switches. The inductor resonates with any capacitors of the upper power switches. Because of the resonant tank circuit, the ON time is nominally fixed, but may vary in response to the controller. A total period for each phase is changing and time is variable, notably because the ON time is variable by the controller.

The present invention is also operable because there is a time period when all lower power switches are ON, and that time period is taken advantage of because of the resonance.

In accordance with the present invention, a multiphase DC-to-DC converter includes at least two phase circuits, each having upper and lower power switches and a front end inductor operative for forming a resonant tank circuit with the phase circuits to ensure zero voltage switching and minimizing power losses. The converter includes a controller operative with the phase circuit for detecting a zero volt crossing. The controller could be a PWM controller or other Buck controller. The resonant tank circuit is created to achieve zero voltage across the power switches, which typically are formed as field effect transistors. The converter could include a feedback signal processing circuit operative with each phase circuit and an output capacitor operative with the voltage output from the phase circuits. A capacitor may be operative with at least each upper power switch and lower power switch. A diode may also be operative with the upper power switch and lower power switch. These capacitors and diodes may be added if the intrinsic capacitance or diode function of the power switch is not enough to form the resonant tank circuit.

BRIEF DESCRIPTION OF THE DRAWINGS

Other objects, features and advantages of the present invention will become apparent from the detailed description of the invention which follows, when considered in light of the accompanying drawings in which:

FIG. 12B depicts formulas governing the operation of the circuit shown in FIG. 12A.

DETAILED DESCRIPTION OF THE PREFERRED EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention improves the overall efficiency of a DC-to-DC converter system because zero voltage switching may be used for non-isolated high input voltage, and low output voltage power converters, for example, "Buck converters."

There exists a need for decreasing the size of power converter, along with the need for higher power densities. This need implies an increase of switching frequency used in the power converters. The use of high switching frequency, however, leads to switching losses, imparted stresses on the power components, and EMI generation. To overcome this disadvantage, soft switching zero voltage switching is used in the present invention.

Figure 1:
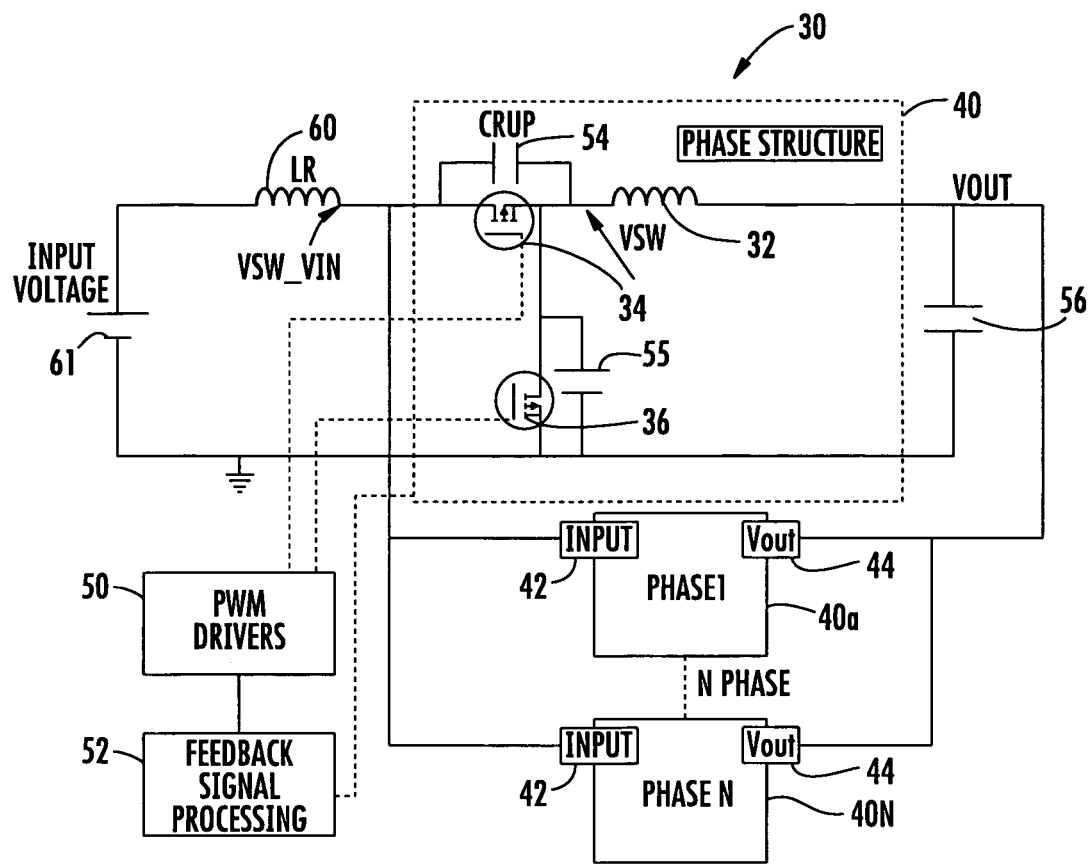
FIG. 1 depicts a schematic diagram of a multiphase switch mode power supply showing a front-end inductor forming a single resonant tank for a multiphase topology of the present invention.

FIG. 1 depicts a fragmentary, block diagram of a portion of the multiphase "Buck" converter 30 as a DC-to-DC converter that includes an output inductor 32 coupled between the load for Vout and a node where the high and low side power switches (MOSFETs) 34 and 36 are connected together. High and low side power switches 34 and 36 are also termed upper and lower power switches, respectively. Different phase circuits 40, 40a, . . . , 40N are cascaded and terminate at phase N as illustrated, to form phase circuits 40, 40a, . . . , 40N. Phase circuits 40, 40a, . . . , 40N include appropriate inputs and outputs 42 and 44. Pulse-width modulation (PWM) drivers 50 are operative with power switches 34 and 36 and may each include a feedback signal processing circuit 52. Capacitors 54 and 55 may be placed in parallel with the power switches 34 and 36 as illustrated, including an output capacitor 56 connected in parallel across the load. Power switches 34 and 36 may have intrinsic capacitance, and capacitors 54 and/or 55 may not be required.

In accordance with the present invention, to have zero volt switching, an input inductor 60 is placed in front of switching circuits 40, 40a, . . . , 40N, as illustrated, and receives input voltage from an input voltage source 61. The control scheme is also changed to detect zero voltage, as will be discussed hereinafter. Input inductor 60 resonates with capacitors 54 of upper power switches 34 in each of the N phases.

Figure 9:
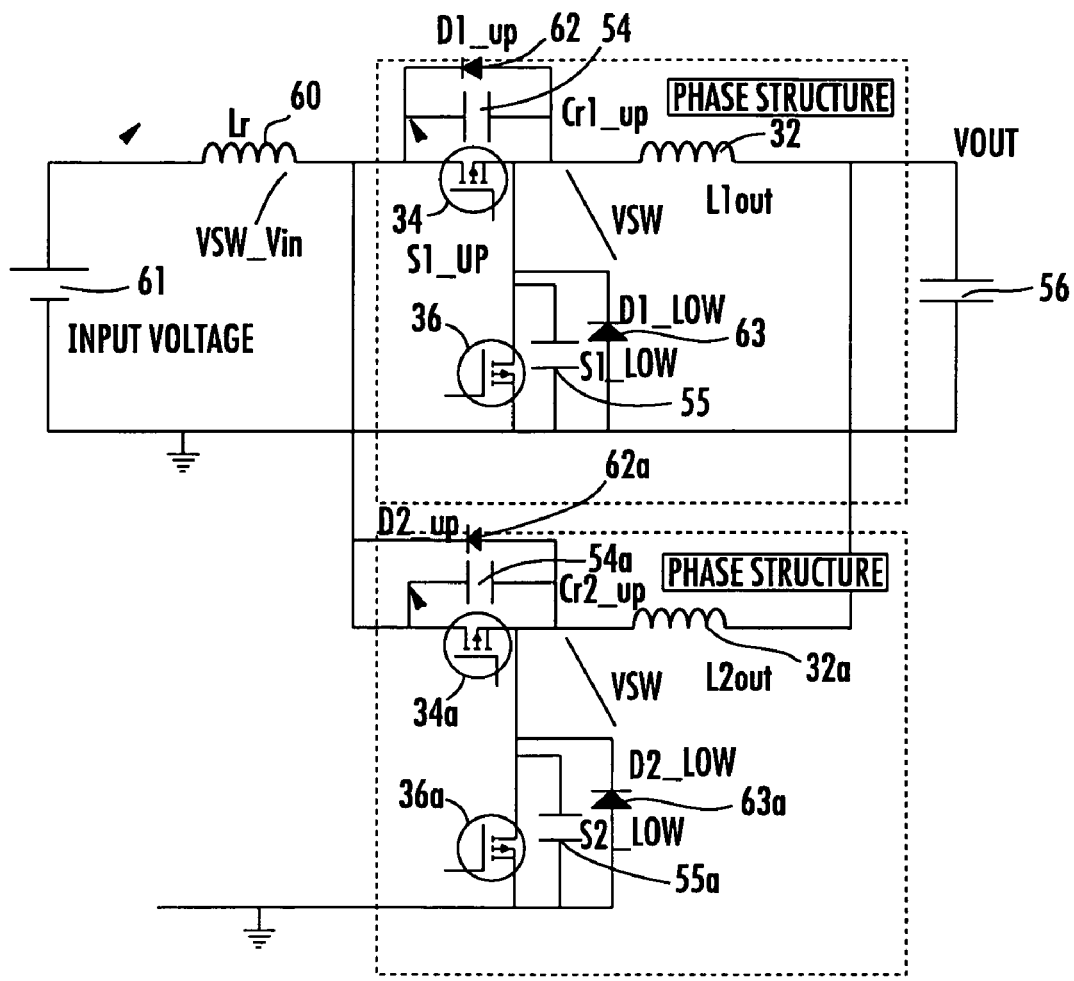
FIG. 9 depicts a schematic diagram showing a two-phase circuit similar to that shown in FIG. 1, but showing greater details of functional components.

FIG. 9 depicts a schematic diagram similar to that of FIG. 1, but showing in greater detail first and second phase structures on circuits 40 and 40a, which are cascaded. Also, each of power switches 34, 34a, 36, and 36a is a power MOSFET, which includes a diode. These diodes 62, 62a, 63, and 63a are labeled D1 in first phase circuit 40 and D2 in second phase circuit 40a, and given the designations "up" for upper power switches 34 and 36, or "low" for lower power switches 34a and 36a. Diodes 62 and 63 could be body diodes. Power switches 34, 34a, 36, and 36a, realized as MOSFETs, would have some intrinsic diode capability, but additional diodes 62 and 63 may be added as necessary for achieving desired inductance as discussed hereinafter.

Figure 9A:
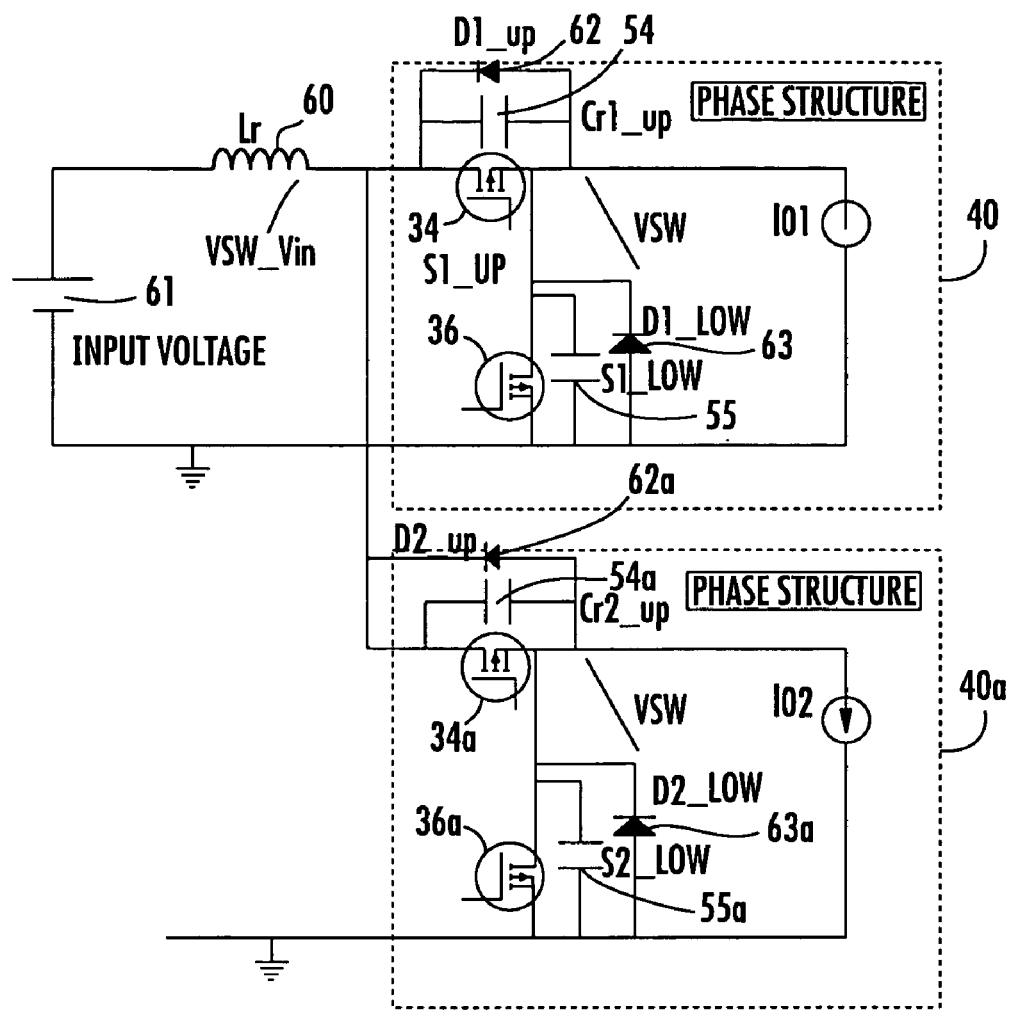
FIG. 9A depicts an equivalent circuit of FIG. 9, showing currents IO1 and IO2 in respective phase structures (circuits).

FIG. 9a depicts an equivalent circuit structure to that of FIG. 9, but without the output and showing currents Io1 and Io2 in the respective phase circuits 40 and 40a. Upper and lower switches 34, 34a, 36, and 36a are given the designations "up" and "low," with first phase circuit switches 34 and 36 designated S1_up and S1_low, respectively, and second phase circuit switches 34a and 36a designated S2_up and S2_low, respectively. In a similar manner, upper and lower capacitors 54, 54a, 55, and 55a are designated Cr1_up, Cr2_up, Cr1_low, and Cr2_low, respectively, and upper and lower diodes 62, 62a, 63, and 63a are designated D1_up, D2_up, D1_low, and D2_low, respectively.

Figure 2:
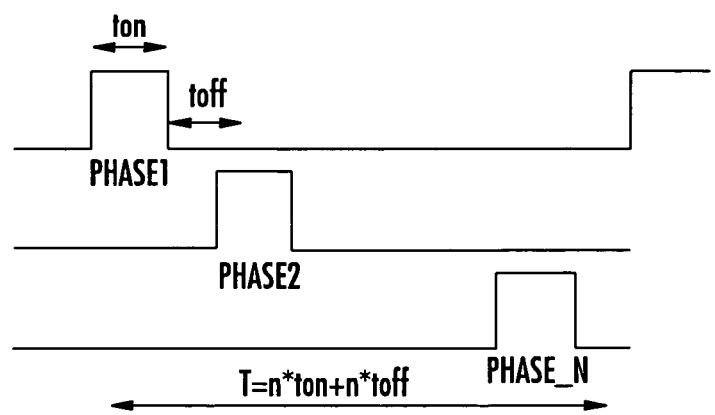
FIG. 2 depicts a timing diagram for N phases in accordance with the present invention.

FIG. 2 depicts a timing diagram of the present invention using input inductor 60 for N phases with ON time and OFF time shown relative to the number of phases. The total time within a duty cycle is equal to the number of phases N times the ON time, ton, plus the number of phases N times the OFF time, toff.

Figure 3:
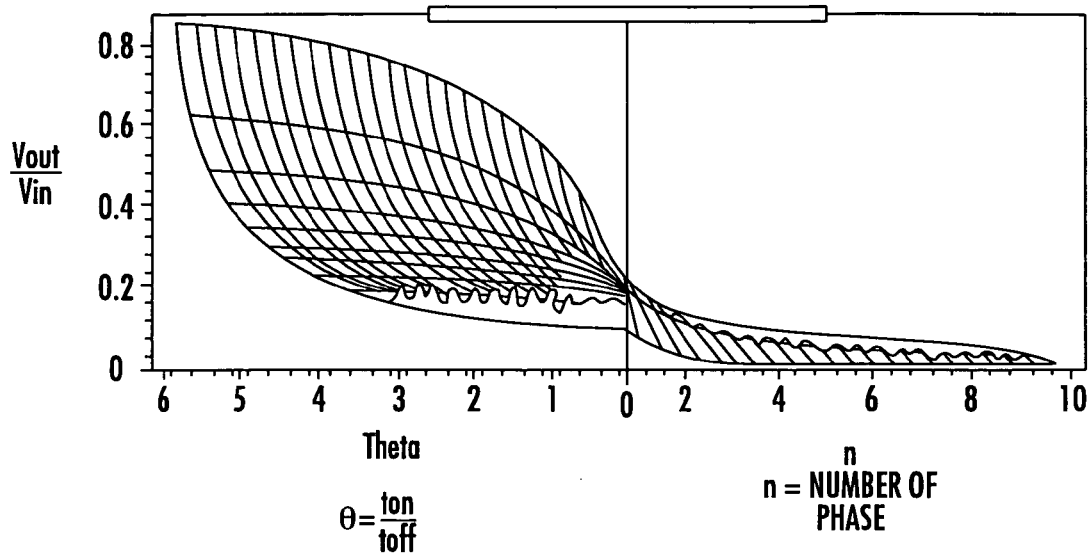
FIG. 3 depicts a graph showing Vout/Vin as a function of theta, θ, and the number of phases, N.

FIG. 3 depicts a graph wherein the vertical axis shows Vout over Vin, and the horizontal axis shows the number of phases on the right and theta, θ, the ON time ton divided by the Off time toff, on the left. Thus, FIG. 3 shows that the voltage OUT Vout divided by the voltage IN Vin is a function of theta θ and the number of phases N.

Figure 4:
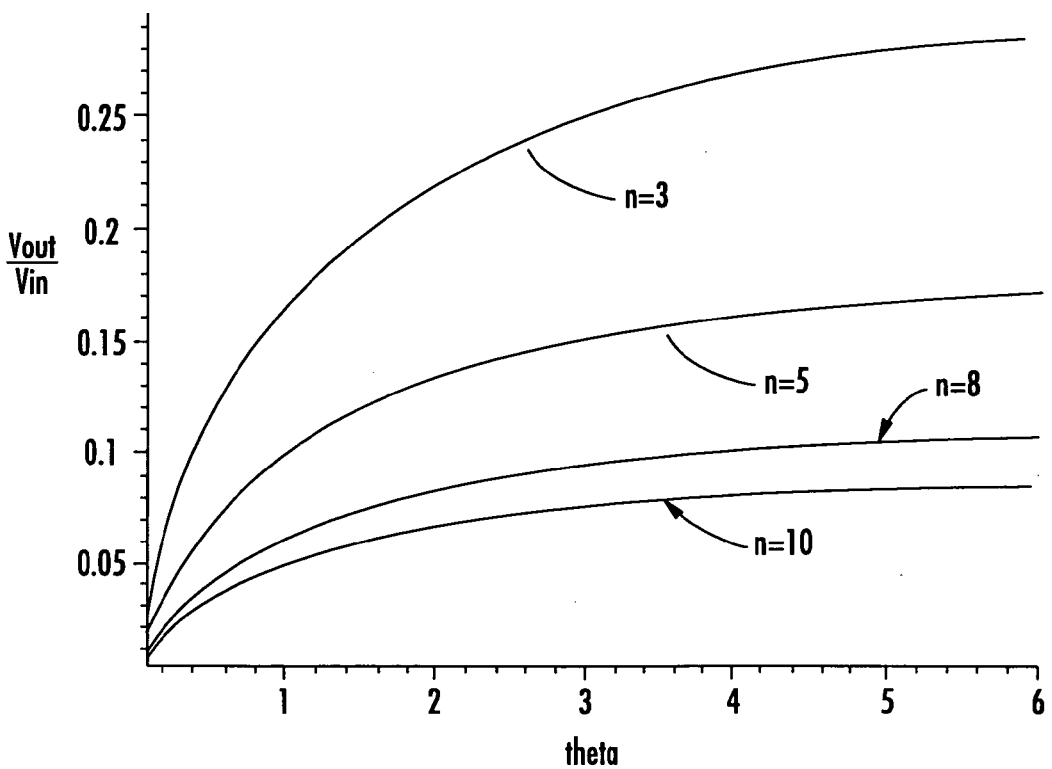
FIG. 4 depicts a graph showing Vout/Vin as a more detailed function of theta, θ, and the number of phases, N.

FIG. 4 depicts in greater detail Vout over Vin as a function of theta θ and the number of phases N.

Figure 5:
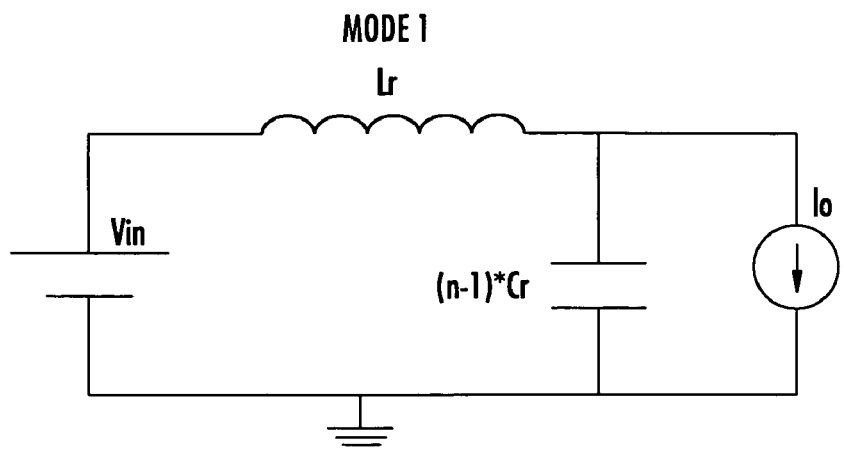
FIG. 5 depicts a schematic diagram illustrating an example of a circuit function relative to Mode 1 for the multiphase DC-to-DC converter of the present invention.
Figure 6:
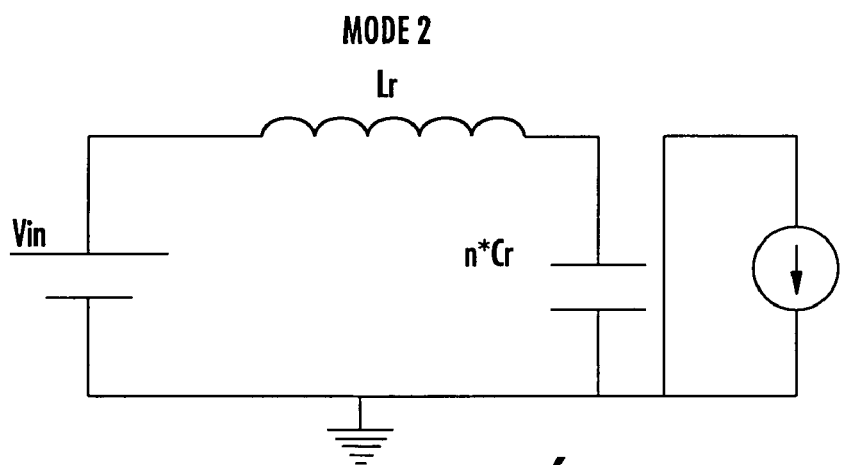
FIG. 6 depicts another schematic diagram similar to that of FIG. 5, but showing a Mode 2 operation.
Figure 7:
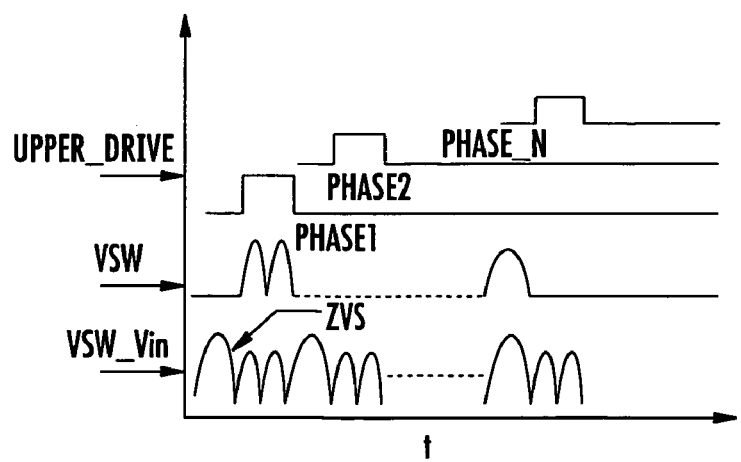
FIG. 7 depicts a graph showing time relative to VSW and VSW_Vin and phases 1, 2, ..., N.
Figure 8:
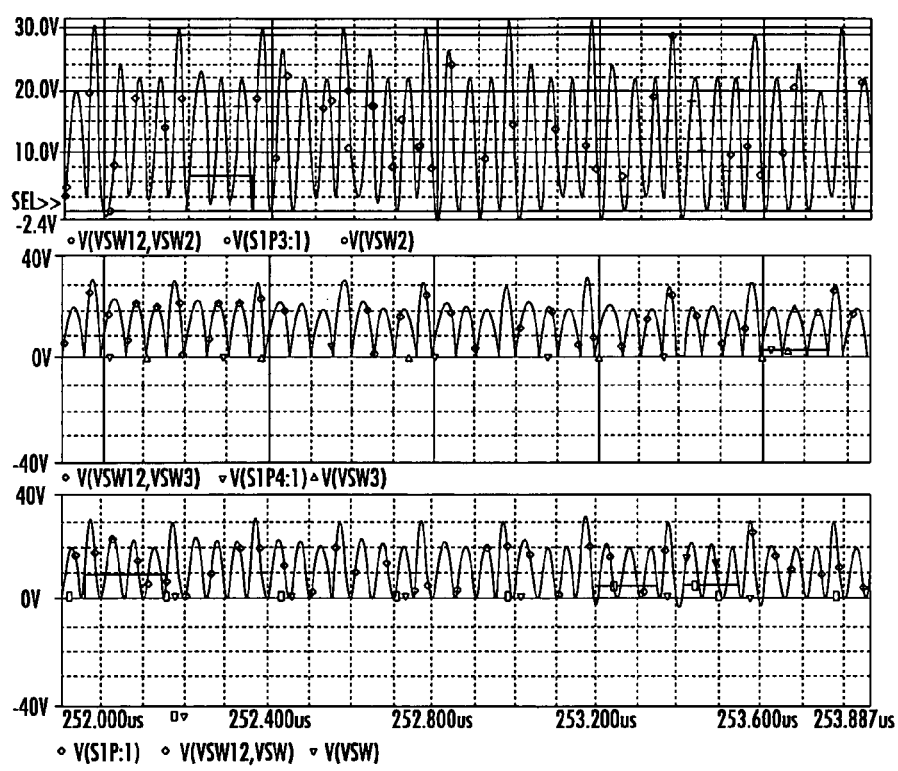
FIG. 8 depicts a graph showing simulation results for three phases that all switch at zero voltage.

FIG. 5 depicts a conceptual schematic diagram demonstrating the function of input inductor 60 of FIG. 1 in mode 1 with upper capacitor 54 and showing a flow of current Io. FIG. 6 depicts a similar conceptual schematic diagram demonstrating a mode 2 operation. FIG. 7 depicts a graph showing zero volt switch points (ZVS) as predetermined times, and the various switching voltage VSW points and upper_drive switching relative to different phases. FIG. 8 depicts the simulation results for three phases, all shown switching at zero voltage.

With reference again to FIGS. 1 through 9a, assume that there are N phases, such as shown in FIG. 1, and that input inductor 60 is large enough so that input voltage source 61 appears as a constant current source. At a time t=0, the cycle starts. Upper power switch 34 of phase 1 is ON, and lower power switch 36 is OFF. Coincidentally, for the (N-1) other phases, upper powers switches 34a, . . . , 34N are off, and lower power switches 36a, . . . , 36N are ON. The operation will differ depending on the modes and the time, t.

With mode 1, at t=$t_{on}$, the phase 1 upper power switch 34 will be turned OFF, and body diode 63 of lower power switch 36 will be turned on. As a result, lower power switch 36 of phase 1 would be turned on at zero voltage. After that time, all lower power switches 36, 36a, . . . , 36N of the N phases would be ON and upper power switches 32, 34a, . . . , 34N would be OFF.

At mode 2, the N capacitors 54, 54a, . . . , 54N will start resonating with input inductor 60, and the resonant time is toff, when input switching voltage VSW_Vin and switching voltage VSW are equal phase 2 may be turned on at zero voltage. The cycle continues for all N phases. When upper power switches 34, 34a, . . . , 34N are OFF and all lower power switches 36, 36a, . . . , 36N are ON, the next mode of operation may start.

Figure 10:
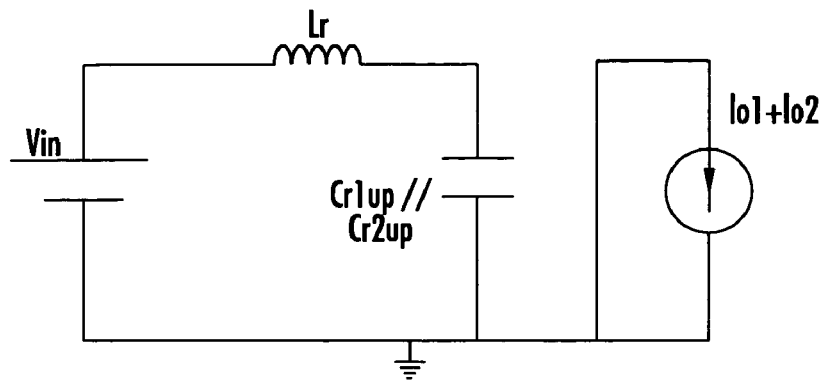
FIG. 10 depicts an equivalent circuit of the present invention showing its function prior to Mode 1.

FIGS. 5 and 6 depict functional circuit representations of a single phase circuit 40, 40a, or 40N. FIG. 8 depicts a simulation graph of the three phases. As may be seen from the simulation graph, the three phases shown all switch at zero voltage. The steady state analysis of converter 30 shows that:

$$\frac{Vout}{Vin} = \frac{1}{N \times \theta + N} \qquad (1)$$

where θ=ton/toff, for example, as shown in FIG. 3, for a higher input voltage Vin and lower output voltage Vout. It is possible to use more phases to achieve a practical duty cycle without the requirement for the down stage. A two-phase (or stage) converter 30 is shown in FIG. 9, and an equivalent circuit of two-phase converter 30 is shown in FIG. 9A. Two phase structures 40 and 40a are shown with the addition of diodes 62 (D1_up) and 63 (D1_low) and diodes 62a (D2_up) and 63a (D2_low) for each power switching phase structure 40 and 40a, respectively, in parallel with capacitors 54 (Cr1_up), 56 (Cr1_low), 54a (Cr2_up), and 56a (Cr2_low), respectively, and in parallel with power switches 34 (S1_up), 36 (S1_low), 34a (S2_up), and 36a (S2_low), respectively. For phase structure 40, Cr1_up capacitor 54 is in parallel with D1_up diode 62. For phase structure 40a, Cr2_up capacitor 54a is in parallel with D2_up diode 62a. Upper and lower switches 34 and 36 or 34a and 36a are illustrated in each phase structure 40 and 40a, respectively. Functional operation of the circuit prior to Mode 1, when t<$t_0$, is shown in FIG. 10.

Figure 11:
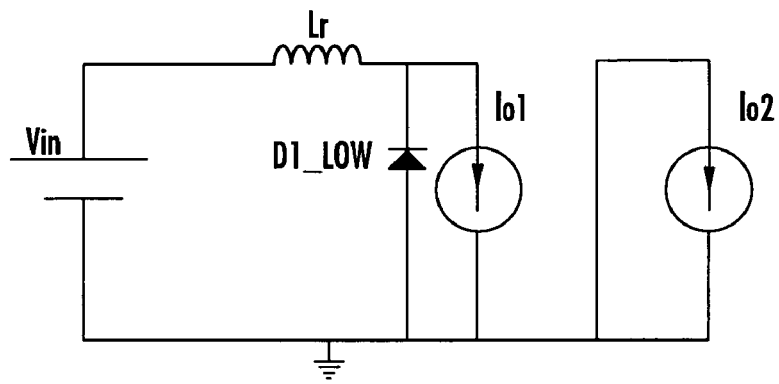
FIG. 11 depicts an equivalent circuit of the present invention showing its function at Mode 1.

At $t_0$, as shown in FIG. 11, s1_up switch 34 is turned on for Mode 1 with the following initial condition:

$$i_{lr}(0) = I_{ro} \qquad (2)$$

$$V_{Cr1\_up}(0) = 0 \qquad (3)$$

-continued $$i_{lr}(t) = \frac{Vin}{L}t + I_{ro} \quad (4)$$

Figure 12A:
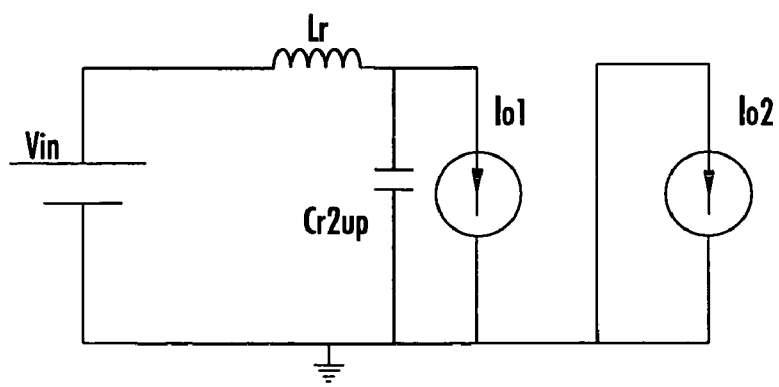
FIG. 12A is an equivalent circuit of the present invention showing its function at Mode 2.
Figures 13A, 13B:
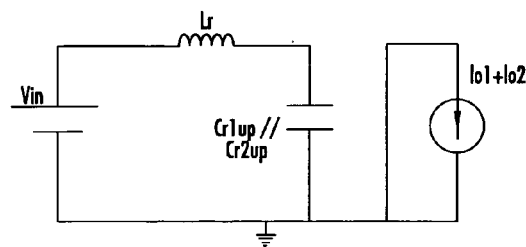
FIG. 13A depicts an equivalent circuit of the present invention showing its function at Mode 3.
FIG. 13B depicts formulas governing the operation of the circuit shown in FIG. 13A.

At $t_2$, the inductor current reaches the output current (Mode 2), which is reflected in the functional drawing of FIG. 12A. This condition may be explained by the formula shown in FIG. 12B. At Mode 3, both switches 34 and 36 are ON, as best shown in the functional circuit diagram of FIG. 13A, with the initial condition explained by the formula shown in FIG. 13B.

Figure 14:
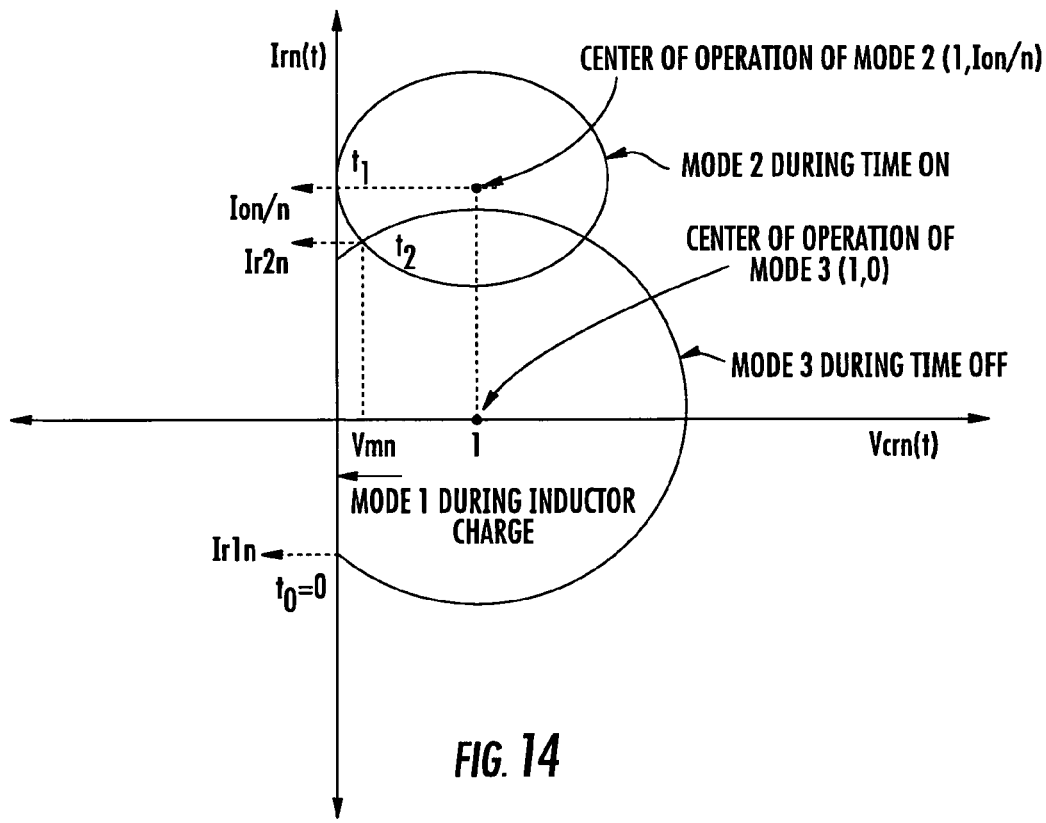
FIG. 14 depicts a graph of a state plane diagram in accordance with the present invention.

A state plane diagram is shown in FIG. 14. This diagram shows the various centers of operation for Mode 2 and Mode 3.

The present invention allows zero voltage switching. Referring again to FIGS. 1 and 9, an example of a two-stage converter 30 (FIG. 1) with zero voltage switching and the function of converter 30 may be expressed as:

$$I_{o1} = I_{o2} = \frac{Io}{2} \quad (5)$$

$$VD1\_low = VD2\_low = 0 \quad (6)$$

$$Cr1\_up = Cr2\_up = Cr \quad (7)$$

Figure 15:
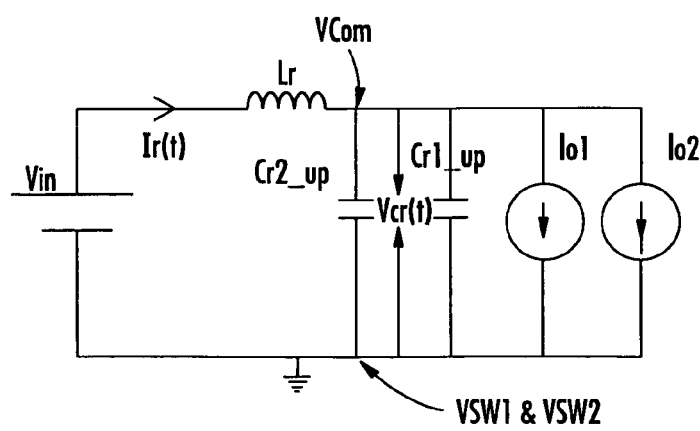
FIG. 15 depicts an example of an equivalent circuit similar to the circuit depicted in FIG. 10 and showing functional operation prior to mode 1.

When the mode of operation is $t<t_0=0$, the mode of operation may be expressed as a circuit function depicted in FIG. 15. The voltage across upper switch 34 of phase 1 (S1_up) is zero. This may be expressed as: switch 34 (S1_up) OFF; switch 34a (S2_up) OFF; switch 36 (S1_low) ON; switch 36a (S2_low) ON; diode 63 (D1_low) OFF; and diode 63a (D2_low) OFF.

Figure 16:
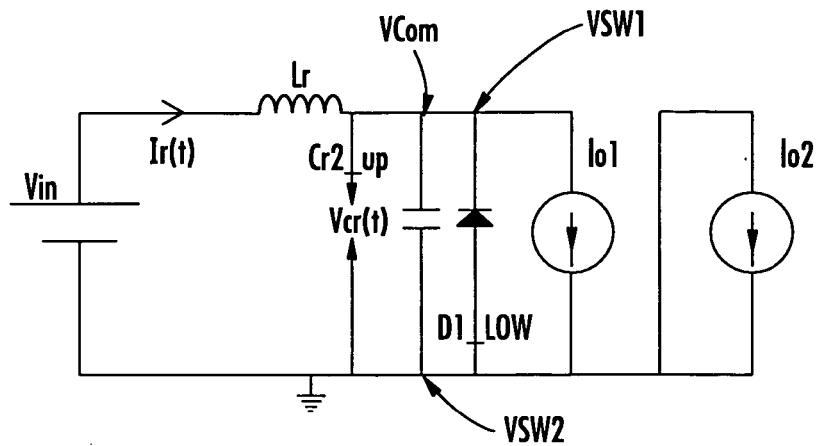
FIG. 16 depicts an example of an equivalent circuit similar to the circuit depicted in FIG. 11 and showing functional operation at mode 1.

Mode 1 of operation, when $0<t<t_1$, is depicted in FIG. 16. This may be expressed as: switch 34 (S1_up) ON; switch 36 (S1_low) OFF; switch 34a (S2_up) OFF; switch 26a (S2_low) ON; diode 63 (D1_low) ON; and Diode 63a (D2_Low) OFF. For purposes of this example:

$$Z = \sqrt{\frac{L_r}{C_r}} \quad (8)$$

$$\omega_o = \frac{1}{\sqrt{L_r C_r}} \quad (9)$$

$$i_r(0) = I_{r1} \quad (10)$$

where the normalized value for V is:

$$V = \frac{V}{V_{in}} \quad (11)$$

and for i(t) is:

$$i(t) = \frac{i(t)Z}{V_{in}} \quad (12)$$

This results in:

$$i_r(t) = \frac{V_{in}T}{L_r} + I_{r1} \quad (13)$$

$$i_{lm}(t) = \omega_o t + I_{r1n} \quad (14)$$

Figure 17:
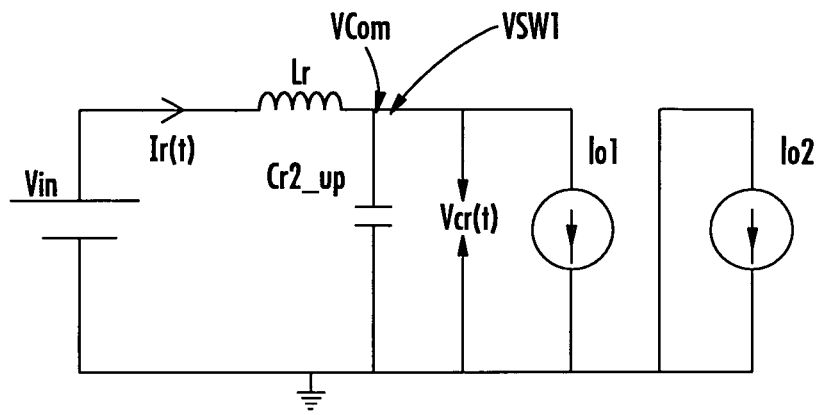
FIG. 17 depicts an example of an equivalent circuit similar to the circuit depicted in FIG. 12A and showing functional operation at mode 2.

Mode 2 of operation, when $t_1<t<t_2$, is depicted in FIG. 17. This may be expressed as: switch 34 (S1_up) ON; switch 36 (S1_low) OFF; switch 34a (S2_up) OFF; switch 36a (S2_low) ON; diode 63 (D1_low) OFF; and diode 63a (D2_Low) OFF. At an initial condition:

$$i_r(t_1) = \frac{Io}{2} \quad V_{cr}(t1) = 0 \quad (15)$$

At a normalized solution:

$$V_{in} - L_r \frac{\partial i_r(t)}{\partial t} - V_{Cr}(t) = 0 \quad (16)$$

$$V_{crn}(t) = 1 - \cos(\omega_o t) \quad (17)$$

$$i_r(t) - C_r \frac{\partial V_{Cr}(t)}{\partial t} - \frac{I_o}{2} = 0 \quad (18)$$

$$i_m(t) = \sin(\omega_o t) + \frac{I_{on}}{2} \quad (19)$$

Figure 18:
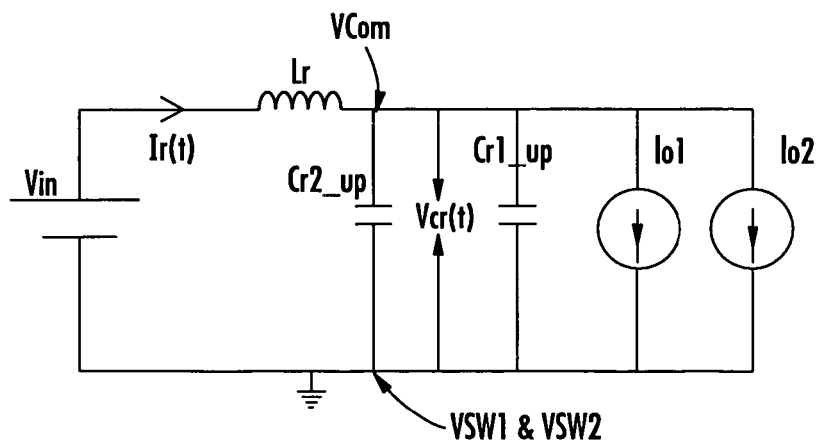
FIG. 18 depicts an example of an equivalent circuit similar to the circuit depicted in FIG. 13A and showing functional operation prior to mode 3.

Mode 3 of operation, when $t_2<t<t_3$, is depicted in FIG. 18. This may be expressed as: switch 34 (S1_up) OFF; switch 36 (S1_low) OFF; switch 34a (S2_up) OFF; switch 36a (S2_low) ON; diode 63 (D1_low) OFF; and diode 63a (D2_low) OFF. The initial condition is:

$$i_r(t_2) = I_{r2} \quad (20)$$

$$V_{Cr}(t2) = Vm \quad (21)$$

The normalized solution is:

$$V_{in} - L_r \frac{\partial i_r(t)}{\partial t} - V_{Cr}(t) = 0 \quad (22)$$

$$i_r(t) - C_r \frac{\partial V_{Cr}(t)}{\partial t} - \frac{I_o}{2} = 0 \quad (23)$$

$$V_{crn}(t) = 1 + \sin\left(\frac{\omega_o}{\sqrt{2}}t\right)(Vmn - 1) \quad (24)$$

$$i_m(t) = \sqrt{2}\sin\left(\frac{\omega_o}{\sqrt{2}}t\right)(1 - Vmn) + \cos\left(\frac{\omega_o}{\sqrt{2}}t\right)I_{r2n} \quad (25)$$

The state plane diagram for this type of function is depicted in FIG. 14. Points are shown for the center of operation of Mode 2, a graph for Mode 2 during ON time, the center of operation for Mode 3, a graph when tie is OFF, and a point for Mode 1 during inductor 60 charge. Analytical solutions are:

$$I_{rIn} = \frac{\sqrt{2}\left(\cos(\omega_0 \text{ton}) - \cos\left(\frac{1}{2}\omega_0\sqrt{2}\,\text{toff}\right)\right)}{\sin\left(\frac{1}{2}\omega_0\sqrt{2}\,\text{toff}\right)} \quad (26)$$

$$I_{rn2} = \frac{\left(\cos\left(\frac{1}{2}\omega_0\sqrt{2}\,\text{toff}\right)\cos(\omega_0 \text{ton}) - 1\right)\sqrt{2}}{\sin\left(\frac{1}{2}\omega_0\sqrt{2}\,\text{toff}\right)} \quad (27)$$

$$V_{mn} = 1 - \cos(\omega_0 \text{ton}) \quad (28)$$

$$I_{on} = 2\frac{-\sin(\omega_0 \text{ton})\sin\left(\frac{1}{2}\omega_0\sqrt{2}\,\text{toff}\right) - \sqrt{2} + \sqrt{2}\cos\left(\frac{1}{2}\omega_0\sqrt{2}\,\text{toff}\right)\cos(\omega_0 \text{ton})}{\sin\left(\frac{1}{2}\omega_0\sqrt{2}\,\text{toff}\right)} \quad (29)$$

$$T_s = 2\text{ton} + 2\text{toff} + \frac{I_{on} - I_{rIn}}{\omega_0} \quad (30)$$

Simplified equations for the circuit functions may be expressed as using:

$$\theta = \omega_o \text{toff} \quad (31)$$

$$\beta = \omega_o \text{ton} \quad (32)$$

$$I_{rIn} = \frac{\sqrt{2}\left(\cos(\beta) - \cos\left(\frac{\theta}{\sqrt{2}}\right)\right)}{\sin\left(\frac{\theta}{\sqrt{2}}\right)} \quad (33)$$

$$I_{r2n} = \frac{\sqrt{2}\left(\cos\left(\frac{\theta}{\sqrt{2}}\right)\cos(\beta) - 1\right)}{\sin\left(\frac{\theta}{\sqrt{2}}\right)} \quad (34)$$

$$I_{on} = 2\frac{\sqrt{2\left(\cos\left(\frac{\theta}{\sqrt{2}}\right)\cos(\beta) - 1\right)}}{\sin\left(\frac{\theta}{\sqrt{2}}\right)} - 2\sin(\beta) \quad (35)$$

$$V_{mn} = 1 - \cos(\beta) \quad (36)$$

$$T_s\omega_o = 2\beta + 2\theta + I_{on} - I_{r1n} \quad (37)$$

The circuit functions with conservation of energy are expressed as:

$$P_{\text{in\_n}} = \frac{2}{T_s}\left(\int_0^0 i_m(t)\partial t = \int_0^1 i_m(t)\partial t + \int_0^{T_s} i_m(t)\partial t\right) \quad (38)$$

$$P_{Out\_n} = I_{on}D \quad (39)$$

Where D is:

$$\frac{V_o}{V_{in}} \Leftrightarrow \text{Duty Cycle} \quad (40)$$

Using the conservation of energy, it is possible to obtain D as a function of β and θ:

$$D = f(\beta, \theta) \quad (41)$$

Figure 19:
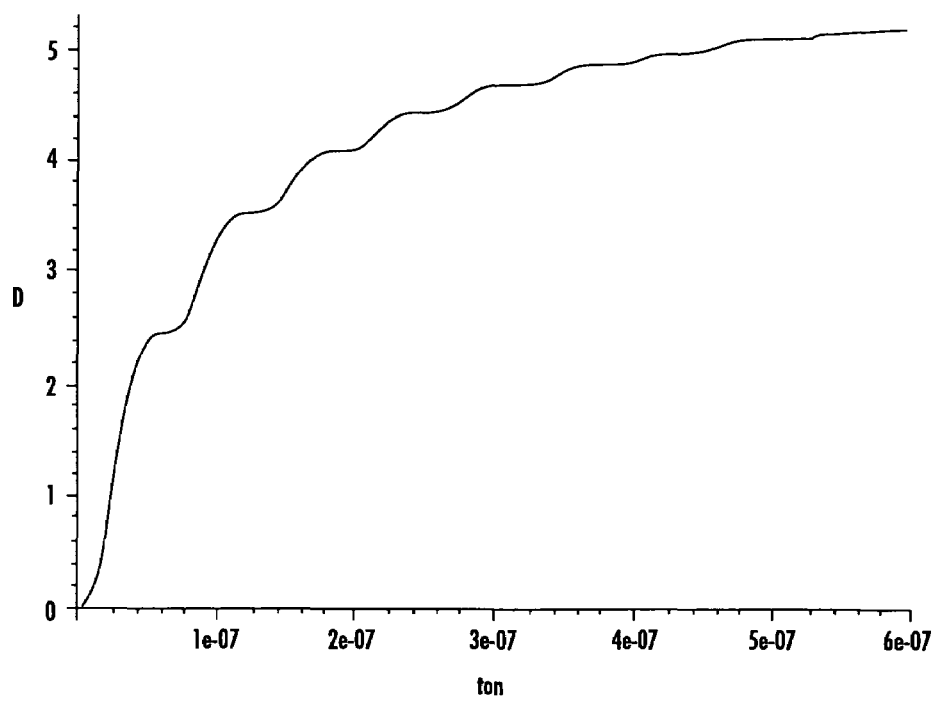
FIG. 19 depicts a graph showing the conservation of energy relative to time in accordance with the present invention.

A graphical example of this conservation of energy is depicted in FIG. 19, where $L_r$=10 nH, $C_r$=10 nF, N=2, and toff=90 nS.

Figure 20:
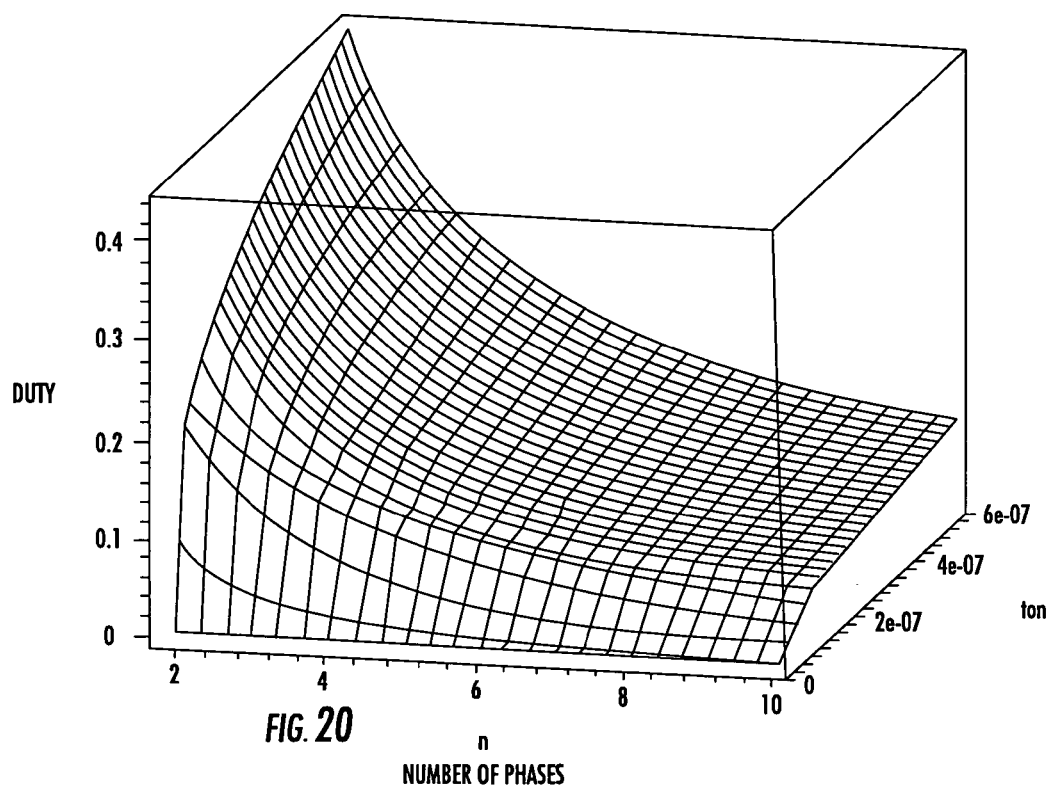
FIG. 20 depicts a three-dimensional graph showing duty versus the number of phases, N, and the ON time.
Figure 21:
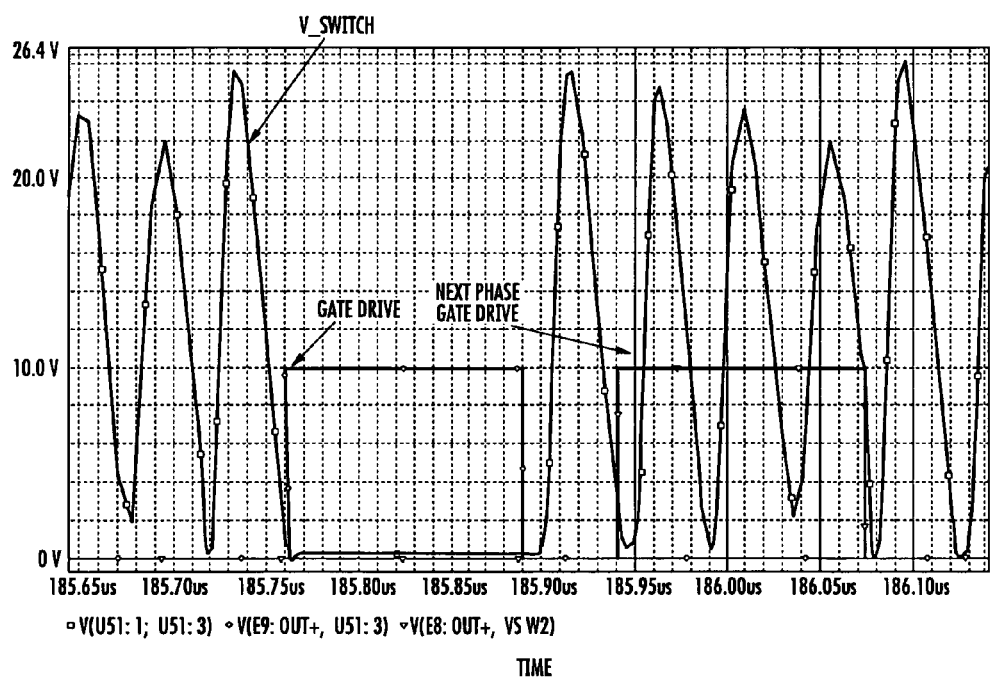
FIG. 21 depicts a graph showing results of a SPICE test.

Generalized solutions for the duty, ON time, and number of phases N are depicted in FIG. 20. This three-dimensional graph shows duty on the vertical axis y and the number of phases N and ON time on the lower axes x and Z. The SPICE (Simulation Program With Integrated Circuit Emphasis) result is depicted in FIG. 21. This graph shows ON time on the horizontal axis and voltage on the vertical axis. The V-switch, gate drive, and next phase gate drive are shown.

Figure 22:
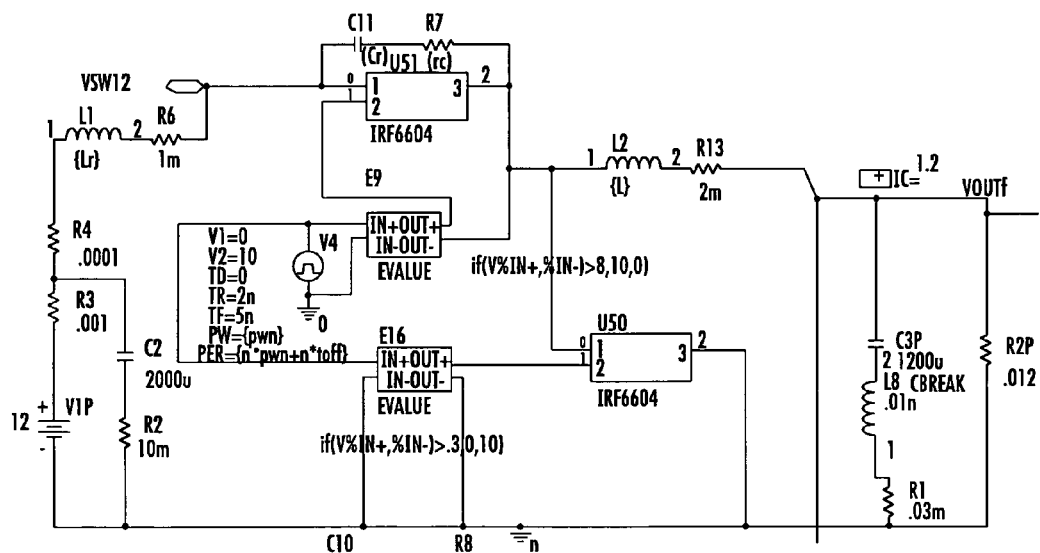
FIG. 22 depicts a schematic diagram showing an example of a SPICE model set-up that may be used for modeling the present invention.

A SPICE model set-up circuit is depicted in FIG. 22. The SPICE model set-up shows various integrated circuits as U51 and U50 operative with various components and IC's. The SPICE model, of course, is a computerized modeling technique for the design of integrated circuits. By entering details of the circuit using the SPICE model as illustrated, it is possible to check for frequency and phase response of the circuit and check the circuit response over a set period of time as a transient analysis as compared to an AC analysis. There are also different analyses to check effects of temperature variations and noise. By using the SPICE model as shown in FIG. 22, the design was tested "on paper" and then prototyped.

Figure 23:
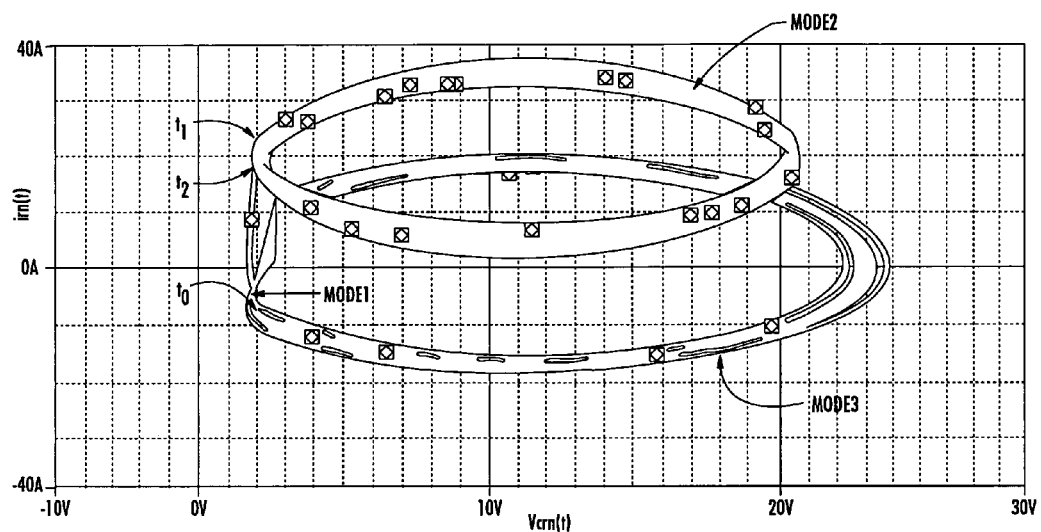
FIG. 23 depicts a graph showing a state plane, full load diagram.
Figure 24:
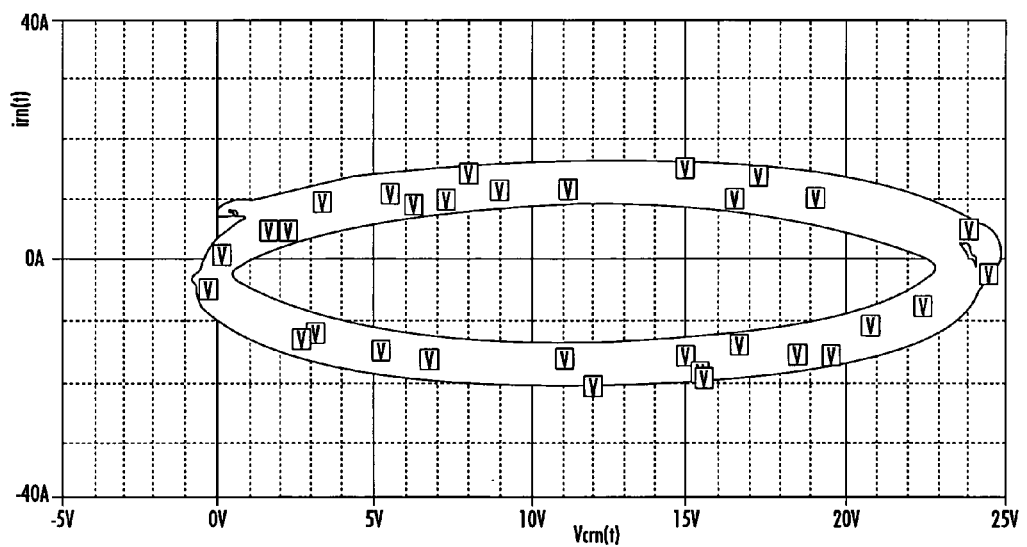
FIG. 24 depicts a graph showing a no load state diagram.
Figure 25:
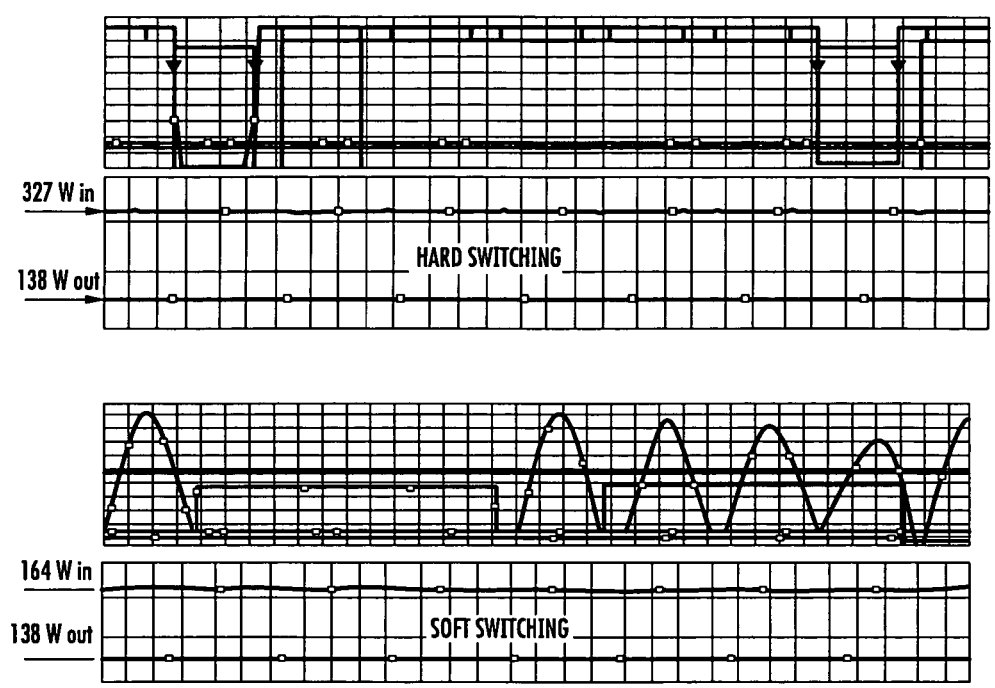
FIG. 25 depicts graphs comparing efficiencies of hard and the soft switching of the present invention.

A graph showing a state plane full load is depicted in FIG. 23. This graph shows modes 1, 2 and 3. A no load state diagram is depicted in FIG. 24. FIG. 25 depicts an efficiency comparison between hard and soft switching.

Many modifications and other embodiments of the invention will be apparent to those of ordinary skill in the art and having the benefit of the teachings presented herein. Therefore, it is understood that the invention is not to be limited to the specific embodiments disclosed, and that modifications thereto and alternative embodiments are intended to be included within the scope of the appended claims.

That which is claimed is:
1. A multiphase DC-to-DC converter comprising:
a plurality of phase circuits, each having an upper power switch coupled to a following lower power switch;
an input inductor coupled to an input voltage source, operative for each of said plurality of phase circuits, forming a resonant tank circuit with each of said phase circuits, and minimizing power losses within said converter;

a controller configured to drive each of said phase circuits; and a feedback circuit configured to provide feedback from each of said phase circuits to said controller to ensure zero voltage switching of said phase circuits.

2. A multiphase DC-to-DC converter according to claim 1 wherein said controller is operative with each of said phase circuits for detecting zero volt crossings therein.

3. A multiphase DC-to-DC converter according to claim 2 wherein said controller comprises a pulse-width modulation controller.

4. A multiphase DC-to-DC converter according to claim 1 wherein said resonant tank circuit is created to achieve zero voltage across said power switches.

5. A multiphase DC-to-DC converter according to claim 1 wherein said upper and lower power switches comprise field effect transistors.

6. A multiphase DC-to-DC converter according to claim 1 and further comprising an output capacitor operative with a voltage output from said phase circuits.

7. A multiphase DC-to-DC converter according to claim 1, and further comprising an output inductor operative within each phase circuit.

8. A multiphase DC-to-DC converter comprising:
more than two phase circuits, each having an upper power switch coupled to a following lower power switch, and having a capacitor operative with at least each upper power switch; and an input inductor coupled to an input voltage source, and operative for forming a resonant tank circuit with said upper power switches and capacitors for each of said phase circuits to ensure zero voltage switching and to minimize power losses.

9. A multiphase DC-to-DC converter according to claim 8 wherein an upper capacitor is connected in parallel to a respective upper power switch.

10. A multiphase DC-to-DC converter according to claim 8 and further comprising a diode operative with each upper power switch to enhance zero voltage switching.

11. A multiphase DC-to-DC converter according to claim 8 and further comprising a diode operative with each lower power switch to enhance zero voltage switches.

12. A multiphase DC-to-DC converter according to claim 8 and further comprising a lower capacitor operative with each lower power switch.

13. A multiphase DC-to-DC converter according to claim 8 and further comprising a controller operative with a phase circuit for detecting a zero volt crossing.

14. A multiphase DC-to-DC converter according to claim 13 wherein said controller comprises a pulse-width modulation controller.

15. A multiphase DC-to-DC converter according to claim 8 wherein said resonant tank circuit is created that achieves zero voltage across said power switches.

16. A multiphase DC-to-DC converter according to claim 8 wherein said upper and lower power switches comprise field effect transistors.

17. A multiphase DC-to-DC converter according to claim 8 and further comprising a feedback signal processing circuit operative with each phase circuit.

18. A multiphase DC-to-DC converter according to claim 8 and further comprising an output capacitor operative with a voltage output from said phase circuits.

19. A multiphase DC-to-DC converter according to claim 8, and further comprising an output inductor operative with phase circuits.

20. A method for regulating a multiphase DC-to-DC converter comprising:
forming a resonant tank circuit with each of a plurality of phase circuits using a front end inductor;

switching an upper power switch and a lower power switch coupled to and following said upper power switch in each of said phase circuits; and maintaining said switching activity at zero volts via feedback to ensure zero voltage switching and to minimize power losses.

21. A method according to claim 20 wherein said method further comprises detecting a zero volt crossing.

22. A method according to claim 20 wherein said method further comprises forming a resonant tank circuit with capacitors operative with said power switches.

23. A method according to claim 20 wherein said method further comprises forming a resonant tank circuit with diodes operative with said power switches.

24. A multiphase DC-to-DC converter according to claim 8 further comprising:
a control circuit coupled configured to control each of said phase circuits; and a feedback circuit configured coupled between each of said phase circuits and said control circuit.

25. A multiphase DC-to-DC converter according to claim 1 wherein said upper power switch is coupled directly to said lower power switch.

26. A multiphase DC-to-DC converter according to claim 1 wherein said input inductor is common to said plurality of phase circuits.

27. A multiphase DC-to-DC converter comprising:
an input voltage source;

an input inductor coupled to said input voltage source;

a plurality of upper power switches coupled to said input inductor, wherein each of said upper powers switches is an upper power switch for one of a plurality of phases;

a plurality of lower power switches, wherein each of said lower power switches is coupled to a corresponding one of said upper power switches for each of said plurality of phases; and a controller configured to drive each of said upper and lower power switches.

* * * * *